United States Patent [19]
Ben-Haim

[11] Patent Number: 6,035,789
[45] Date of Patent: Mar. 14, 2000

[54] MOUSEPAD

[76] Inventor: Niv Ben-Haim, 62 Alameda Cir., Thornhill, Ontario, Canada, L4J 8AG

[21] Appl. No.: 09/174,965

[22] Filed: Oct. 19, 1998

[51] Int. Cl.[7] .................................................. A47B 23/00
[52] U.S. Cl. ...................... 108/43; 248/346.01; 248/918; 248/444
[58] Field of Search .................. 108/43; 248/346.01, 248/918, 444, 118, 118.1; 206/1.7, 1.8, 1.9; D19/35, 36, 52

[56] References Cited

U.S. PATENT DOCUMENTS

| | | | |
|---|---|---|---|
| 126,213 | 4/1872 | Andrews et al. | 108/43 |
| D. 392,960 | 3/1998 | Giorgio . | |
| 2,656,633 | 10/1953 | Bergen | 108/43 |
| 2,663,603 | 12/1953 | Newman | 108/43 |
| 4,243,249 | 1/1981 | Goss | 108/43 X |
| 5,081,936 | 1/1992 | Drieling | 108/43 |
| 5,355,811 | 10/1994 | Brewer . | |
| 5,556,061 | 9/1996 | Dickie | 248/346.01 X |
| 5,593,128 | 1/1997 | Odom et al. | 248/918 X |
| 5,607,091 | 3/1997 | Musacchia | 108/43 X |
| 5,779,211 | 7/1998 | Bird | 248/918 X |
| 5,862,933 | 1/1999 | Neville | 108/43 X |
| 5,876,010 | 3/1999 | Murphy | 248/346.01 |

FOREIGN PATENT DOCUMENTS

| 437011 | 4/1912 | France | 108/43 |
|---|---|---|---|

*Primary Examiner*—Peter M. Cuomo
*Assistant Examiner*—Hanh V. Tran
*Attorney, Agent, or Firm*—Ohlandt, Greeley, Ruggiero & Perle, LLP

[57] ABSTRACT

A mousepad assembly has a stiffened pad upon which a computer mouse can ride, and a stay, in the nature of a releasable strap, that can be wrapped about the upper thigh of the user. As located the mousepad assembly sits in the user's lap. It has a profile that has smoothly rounded corners and a recess for accommodating the torso of the user. The mousepad sits at a skewed angle relative to the user's lap. The mousepad is reversibly mountable in left-handed or right handed configurations.

11 Claims, 4 Drawing Sheets

MOUSEPAD

FIELD OF INVENTION

This invention relates generally to a mousepad which provides a surface for a computer mouse to ride upon. In particular it relates to a portable mousepad that is shaped to rest on the lap, or a portion thereof, of a user.

BACKGROUND OF THE INVENTION

At present, it is common for computer users to have a mousepad on which a computer mouse can roll, thereby moving a cursor on a monitor screen. Most often the mousepad rests upon a table or desk beside the computer itself Repeated use may cause the operator's arm and hand to grow tired or stiff. This may be because the arm must reach too far out, or at an awkward angle.

In other instances, a mouse may be used to move a cursor on, for example, a television screen on the far side of a room. A suitable table or desk may not be available, or may be inconvenient. In still other instances, a laptop computer can be small enough to be carried inside a briefcase. When traveling or using one's laptop computer in a small space, there may not be a convenient table top or other customary space for operating a conventional computer mouse.

In each of these instances it may be advantageous to have a mousepad that does not require a desk, table or like surface, but rather that can rest on a part of the user's body. For example, it would be advantageous to have a mousepad that can rest on the user's lap, thigh or upper leg.

At least two inventors have considered the problem of providing a mousepad that is portable and does not require a table or other large surface. U.S. Pat. No. 5,355,811 of Brewer, issued Oct. 18, 1994 discloses a small rectangular table that can be worn above a user's knee. The table is equipped with a pair of laterally adjustable blocks with curved sides for seating against the leg. U.S. Design Pat. No. 392,960 of Giorgio, issued Mar. 31, 1998, also shows a portable, flat mousepad surface. A mounting bracket with curved arms, such as might fit on a person's leg, emanates from the underside of the mousepad.

Illustrations in the two documents noted above show rectangular surfaces with the rectangle aligned perpendicular to the arms, or supports, that are available to engage the leg. A square or relatively sharp corner might wedge uncomfortably against the stomach. It would be advantageous to have a mousepad assembly that at least partially, accommodates the shape of the user's body. For example, when one is sitting it would be advantageous to have a mousepad that will lie on the lap, with one edge toward the torso. In such a position, the arm can be held relatively close to the body, perhaps with the elbow supported in a resting position on the armrest of a chair.

Typical computer mice have a track-ball with a rubberized coating captured within a socket. As the ball rolls against a surface the motion is converted into an electrical signal which causes the cursor to move on the screen of the computer monitor. Track-ball mice tend to be gravity dependent. Although it is customary to operate a mouse on a flat table, a gravity dependent mouse can usually operate on a moderate slant, and can usually operate on a surface that is not precisely flat, but has a modestly convex curvature. That is, a mousepad need not be perfectly flat or level, but can rest on an uneven surface, such as a person's lap or leg.

When a mousepad surface is placed above the knee, perhaps well up on the thigh, the hand holding the mouse does not generally work perpendicular to the leg and parallel to the leg. That is, the normal square orientation suggested by the illustrations of Brewer and Giorgio does not reflect actual operation in a user's hand. More typically, a mouse is held in the working hand, with the base of the palm of the hand resting against the mousepad in the near corner. Motion of the cursor in the 'X' direction (that is, across the width of the monitor screen) tends to occur when the user rocks the hand at the wrist, moving the mouse generally diagonally relative to the mousepad. In this rocking motion of the hand, the base of the palm usually remains in constant contact with the mousepad. Motion in the 'Y' direction (that is, across the height of the monitor screen) tends to occur when the mouse user straightens or curls the fingers of the mouse holding hand. This 'Y' motion involves a displacement from the near diagonal corner of the mousepad toward the far diagonal corner. Again, the heel, or base, of the palm generally remains in contact with the mousepad throughout the motion.

It would also be advantageous to have a mousepad that is rounded, and that has a relief, or recess to accommodate the curvature of the torso. It would be advantageous to have a mousepad that can be secured to the lap and thereby be encouraged to remain relatively steady while in use. It would also be advantageous to have a mousepad that is not necessarily intended to have a square or rectangular shape, and whose sides are aligned parallel or perpendicular to the axis of the upper leg bone. It would be advantageous to have a mousepad that can be secured to the upper thigh at an angle to the leg bone, and that has a region for the base of the palm to rest on in use.

When using a laptop computer, it would be inconvenient, and disadvantageous, to have a mousepad whose mounting bracket is so large that either it cannot fit easily within a briefcase. It would be preferable to have a mousepad assembly that would lie flat either within one of the divider pockets of the lid, or within a file folder.

SUMMARY OF THE INVENTION

In an aspect of the invention, there is a computer mousepad. It has a working surface upon which a computer mouse can ride, a portion for resting upon a support and, in plan view, a recess for accommodating a body.

In an additional feature of that aspect of the invention, the resting portion of the mousepad is a mounting surface for placement against at least part of the thigh of a user and the recess is shaped to accommodate a portion of the body of the user. In another additional feature of that aspect of the invention, the surface of the mousepad has a profile, in plan view, that is free of sharp corners.

In a still further additional feature of that aspect of the invention, the mousepad has stiffening so that the working surface is substantially rigid. In still another further additional feature of that aspect of the invention, the working surface is substantially planar in use. In yet another additional feature of that aspect of the invention, the working surface is reversible to permit placement against the body of the user in either left-hand or right-hand configurations.

In still another additional feature of that aspect of the invention, the assembly further comprises a cushioning layer between the working surface and the stiffening. In still yet another additional feature of that aspect of the invention, the working surface is an erasable surface.

In another additional feature of that aspect of the invention, the mousepad further comprises at least one fitting for securing a stay to the mousepad. In yet another additional feature of that aspect of the invention, the fitting is formed integrally with the mousepad.

In another additional feature of that aspect of the invention, the working surface has a periphery having a proximal portion for location adjacent to the torso of a user, and an outboard portion for location generally adjacent the outer thigh of the user. The working surface includes a proximal outboard corner region bounded by the proximal and outboard portions of the periphery. The proximal outboard corner region has a shape for supporting the base of the palm of the mouse-operating hand of the user.

In yet another feature of that aspect of the invention, the working surface has a periphery having a proximal portion for location adjacent the torso of a user. The proximal portion includes the recess for accommodating the torso. The working surface also has an outboard portion for location adjacent the outer thigh of the user, a distal portion most distantly opposed to the proximal portion, and an inboard portion for location adjacent the inner thigh of the user in opposition to the outboard portion. Inner and outer lobes are defined on either side of the recess. A first diagonal is defined by the straight line that can be constructed from the outer lobe to the furthest point therefrom on the periphery. A second diagonal is defined by the longest straight line that can be constructed from the inner lobe to the furthest point therefrom on the periphery. The first diagonal is longer than the second diagonal.

In still yet another feature of that aspect of the invention, the working surface has a periphery having a proximal portion for location adjacent the torso of a user, and the proximal portion includes the recess for accommodating the torso. The working surface also has an outboard portion for location adjacent the outer thigh of the user, a distal portion most distantly opposed to the proximal portion, and an inboard portion for location adjacent the inner thigh of the user in opposition to the outboard portion. Inner and outer lobes are defined on respective inboard and outboard sides of the recess. A first diagonal is defined by the straight line that can be constructed from the outer lobe to the furthest point therefrom on the periphery. The working surface is locatable relative to a user's thigh such that, in plan view, the minor angle between the diagonal and a reference axis drawn between the hip socket and the knee socket of a user is less than 45 degrees.

In a further feature of that aspect of the invention, the working surface has a periphery having a proximal portion for location adjacent the torso of a user. The proximal portion includes the recess. The working surface also has an outboard portion for location adjacent the outer thigh of the user, a distal portion most distantly opposed to the proximal portion and an inboard portion for location adjacent the inner thigh of the user in opposition to the outboard portion. The outboard, inboard and distal portions are at least partly convexly curved.

In another aspect of the invention, a mousepad comprises a portion for resting on upon a support, and a working surface upon which a computer mouse can ride. The working surface has defined therein a pair of apertures for permitting the passage of a stay in the nature of strapping to be threaded therethrough.

In still yet another additional feature of that aspect of the invention, the pair of apertures is a pair of slots and the slots are skewed relative to each other.

In a further additional feature of that aspect of the invention the working surface has a periphery having a proximal portion for location proximate the torso of a user, a distal portion for location distant from the torso of the user, and inner and outer portions lying between, and joining, the distal and proximal portions, the inner and outer portions for placement, respectively, adjacent the inner and outer thighs of a user's leg. The proximal portion has a recess for accomodating a user's body. The periphery includes a first lobe and a second lobe bounding the recess therebetween. One of the apertures lies farther than the other aperture from a datum line drawn tangent to the first and second lobes.

In still a further additional feature of that aspect of the invention, one of the apertures is an inner aperture located in the member adjacent to the inner portion and the other is an outer aperture located adjacent to the outer portion. The inner aperture is farther from the datum line than the outer aperture.

In yet a further additional feature of that aspect of the invention, the mousepad has a proximal portion for placement proximate to the torso of the user and a distal portion for placement distant from the torso of the user; and the apertures are outwardly toed relative to the proximal portion.

In still yet a further additional feature of that aspect of the invention, one of the apertures is an inner aperture located adjacent to the inner portion. The other aperture is located adjacent to the outer portion. A reference line can be drawn between the geometric centers of the apertures and the mousepad is locatable relative to a user's thigh such that, in plan view, a perpendicular to the datum line is skewed relative to a reference axis drawn between the hip socket and the knee socket of a user.

In another aspect of the invention, there is a mousepad assembly. The mousepad assembly has a member having a working surface upon which a computer mouse can ride. The member has a portion for resting upon a support. The member has, in plan view, a recess for accommodating an adjacent body and a stay connected to the member for engagement with the body of the user to maintain the orientation of the surface relative to the body of the user.

In an additional feature of that aspect of the invention, the stay of the mousepad assembly includes strapping. The member has defined therein a pair of elongated apertures through which the strapping is admitted and the apertures are skewed relative to each other. In another additional feature of that aspect of the invention, the stay has a pair of ends that can be fastened together. In still another additional feature of that aspect of the invention, the stay includes webbing for extending about the thigh of the body of the user and the webbing is foldable to lie next to the member in a stored position.

In yet another additional feature of that aspect of the invention, the thickness of the assembly, in stored position, is less than one inch. In a further additional feature of that aspect of the invention, the assembly, in the stored position, has a thickness small enough to permit storage in a briefcase lid folder. In yet a further additional feature of that aspect of the invention, the assembly, in the stored position, can be stored in a space whose thickness is as little as four times the thickness of the stiffened member.

In a still further additional feature of that aspect of the invention, the portion for resting upon a support includes a mounting surface of the member for engaging the thigh of the user. The member has stiffening underlying the working surface and overlying the mounting surface. The member has a periphery having a proximal portion for location adjacent the torso of a user, the proximal portion including the recess, an outboard portion for location adjacent the outer thigh of the user, a distal portion most distantly opposed to the proximal portion and an inboard portion for location adjacent the inner thigh of the user in opposition to the outboard portion. The outboard, inboard and distal portions are at least partly convexly curved. The proximal and outboard portions meet at a proximal outboard corner. The proximal and inboard portions meet at a proximal inboard corner. The member has a first diagonal defined by a straight line constructed from the proximal outboard corner to the furthest point therefrom on the periphery. The member has a second diagonal defined by the longest straight line that can be constructed from the proximal inboard corner to the furthest point therefrom on the periphery and the first diagonal is longer than the second diagonal.

In still yet a further additional feature of that aspect of the invention, the minor angle included between the first diagonal and an axis extending from the center of the hip socket to the center of the knee socket of a user is less than 45°.

BRIEF DESCRIPTION OF DRAWINGS

The invention is described below with reference to the accompanying illustrative Figures in which.

DETAILED DESCRIPTION OF THE INVENTION

Figure 1:
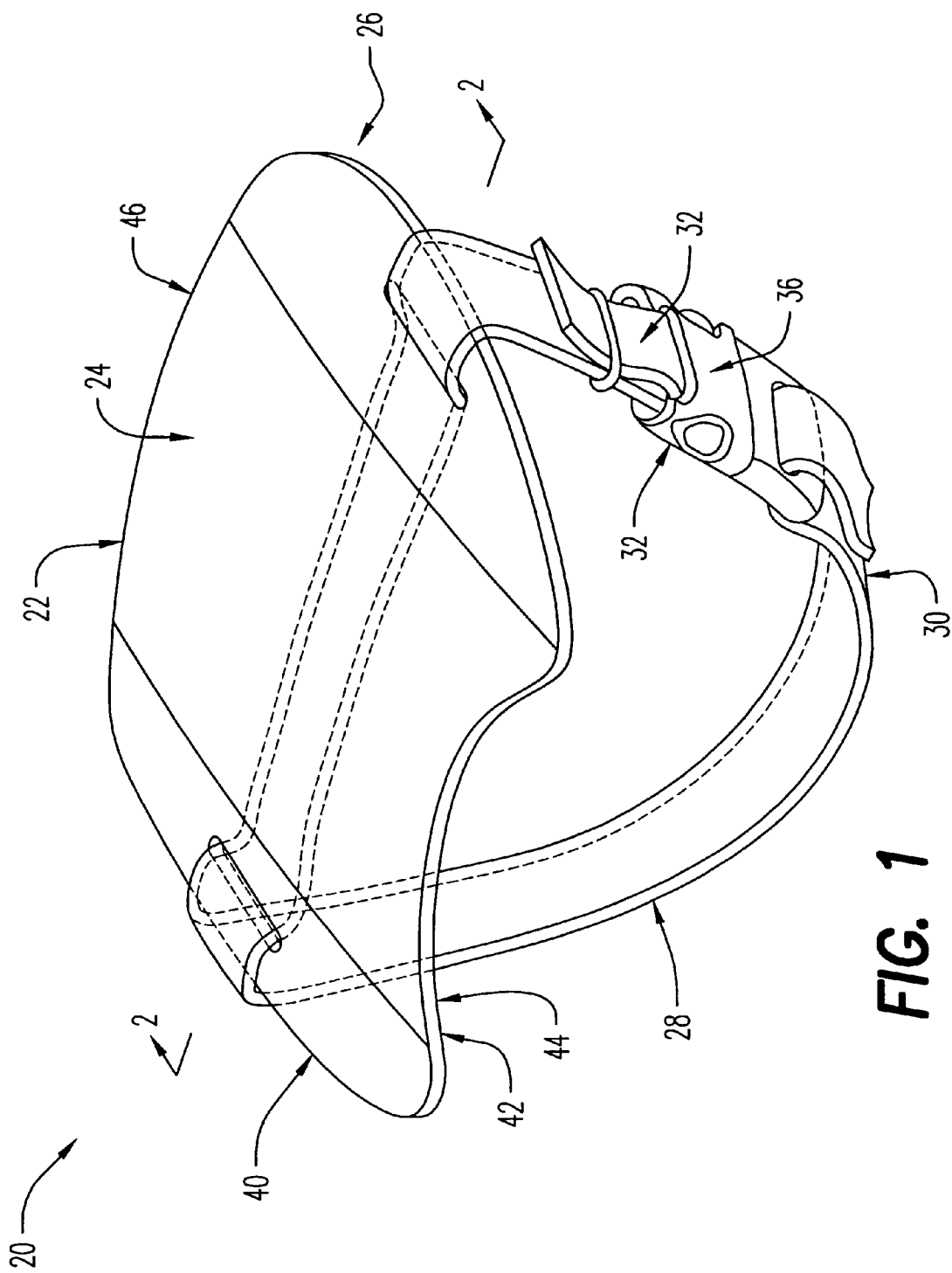
FIG. 1 shows a perspective view of an example of a mousepad according to the principles of the present invention.
Figure 2:
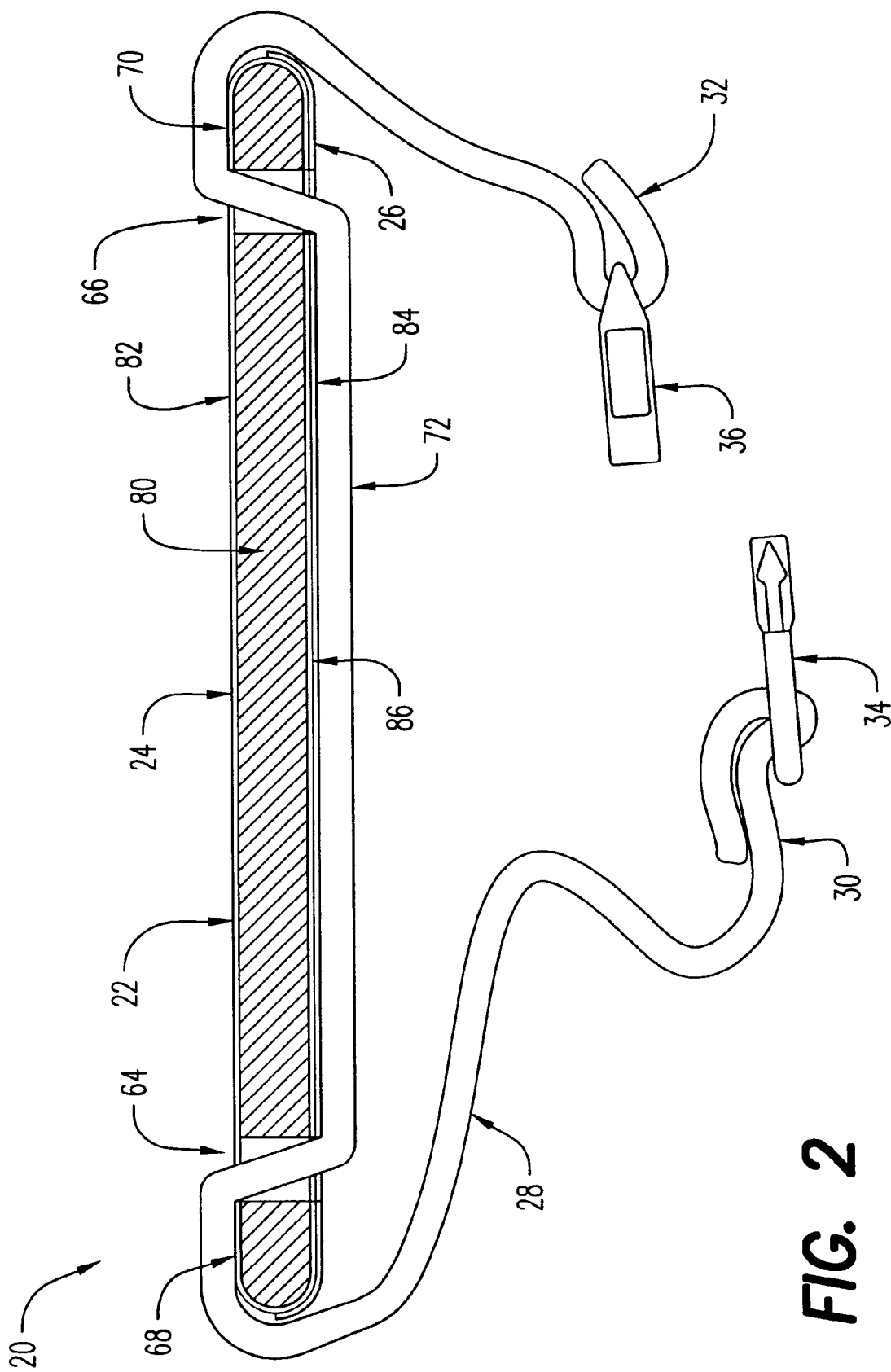
FIG. 2 is a view taken on section "2—2" of FIG. 1.

The description which follows, and the embodiments described therein, are provided by way of illustration of an example, or examples of particular embodiments of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order to depict certain features of the invention more clearly.

A mousepad assembly for use with a computer mouse, according to the principles of the present invention is shown in FIGS. 1 to 4 as 20. It has a substantially planar, substantially rigid mousepad member 22 that has an upper, or working surface 24 upon which a computer mouse may ride. It also has a portion in the nature of a bottom mounting surface 26 for engagement with a part of the body, such as the thigh, of a person using mousepad assembly 20 and a suitable mouse. Mousepad assembly 20 also has a stay, in the nature of a strap 28 that can be wrapped around a part of the user's body, such as the upper thigh, to encourage member 22 to remain relatively steady during use. Strap 28 has first and second ends 30 and 32 that can be fastened together. In the preferred embodiment illustrated, the strap may be made of webbing and the fastening is achieved by adjustable male and female quick release fasteners 34 and 36 which link when pressed together. Fabric hook and eye strips, a belt and buckle attachment, snaps, or other suitable attachment may also be used. Similarly, another alternative to strap 28 could possibly be a continuous elasticized band to be slipped on the leg, or other body part as convenient.

Figure 3:
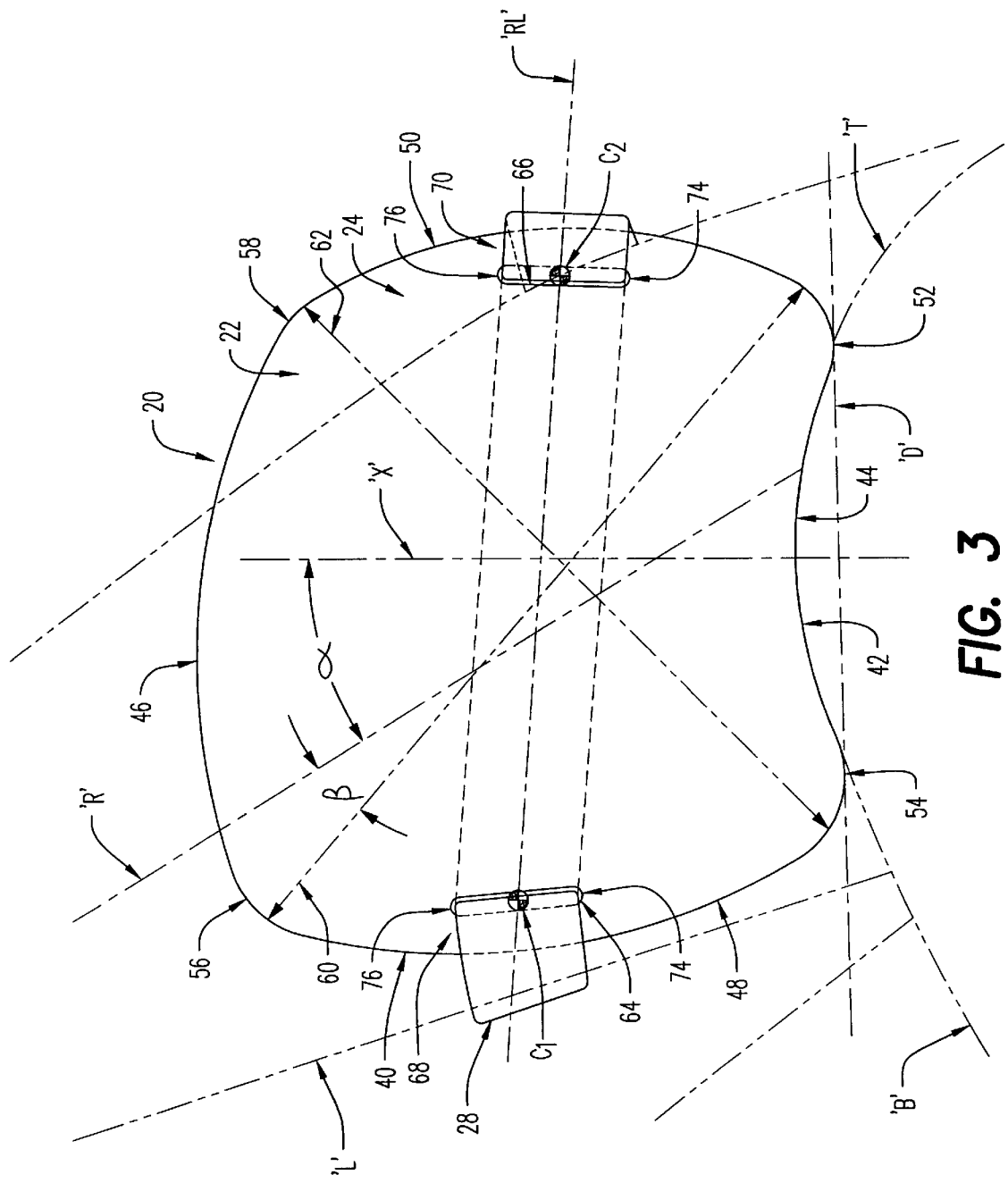
FIG. 3 is a plan view of the mousepad of FIG. 1.

Referring to FIG. 3, mousepad assembly 20 is shown in plan view, in relationship to the broken, dashed outline of a user's body, indicated as 'B'. Body 'B' includes the Torso of the body, taken in a downwardly looking view, is indicated generally as 'T', and the upper right leg, which is indicated generally as 'L'. Mousepad assembly 20 can be seen, in this plan view, to have a periphery 40. Periphery 40 is a continuous smooth curve that defines a somewhat square, rectangular, or quadrilateral shape of the mousepad member 22. The periphery, 40, has a first, or proximal portion 42 that has a relief in the nature of an indentation, or recess 44, in the form of a concave bight, for placement proximate the torso 'T' of the user. It has a second, or distal portion 46 that is, in a general sense, opposite to the proximal portion 42. That is, the distal portion 46 bounds the region of the main member 22 that is furthest from the torso 'T'. Distal portion 46 has a convex curvature.

A convex third, or inner portion 48 lies between, and is smoothly splined into, the inner ends of the proximal and distal portions 42 and 46. Similarly a convex fourth, or outer portion 50 lies between, and is smoothly splined into, the outer ends of proximal and distal portions 42 and 46. The smooth splining noted above occurs at each of four corner regions 52, 54, 56, and 58 in which the radius of curvature of the smooth curve of periphery 40 is smaller than in the adjacent proximal, inner, distal, and outer portions. As shown, the sharpness of these corners varies in the embodiment illustrated, and the radius of curvature varies from point to point on periphery 40. The two proximal corners 52 and 54 have relatively small radii of curvature, and have the appearance of lobes. The inner distal corner, 56 is more rounded, and the outer distal corner 58 is generously rounded. Subject to having a recess to accommodate the body of the user, and to the requirement of providing a working surface of adequate size, the selection of the particular profile and curvatures is a matter of aesthetic choice. Neither the four side portions, nor the corner regions need have a constant radius of curvature, and could have one or more flat sections.

A long diagonal is indicated as 60. It is defined as the longest straight line that can be made to intersect periphery 40 extending from corner 52. It intersects periphery 40 at right angles at both ends. Similarly a short diagonal 62 is defined as the longest line that can be drawn to extend from a point in corner 54 within the boundaries of periphery 40. A reference axis 'R' indicates the axis of the upper thigh, and may be taken as a line running from the center of the socket of the hip to the center of the socket of the knee of the user. The minor included angle between long diagonal 60 and reference axis 'R' is indicated by β. A tangent line, or datum, 'D', has been constructed from corner 52 to corner 54 across recess 44. The perpendicular bisector of datum 'D' is shown as one axis 'X'. The minor angle included between reference axis 'R' and bisector axis 'X' is indicated as α.

Fittings for attaching strap 28 to mousepad member 22 in the nature of a pair of left and right hand slots, 64 and 66, have been defined through member 22 leaving the margins, 68 and 70, of member 22 along inner and outer portions 48 and 50. Slots 64 and 66 are of a size to accommodate passage of strap 28. As can best be seen in the cross-section of FIG. 2 ends 30 and 32 of strap 28 are fed through slots 64 and 66 respectively, and then wound outwardly around margins 68 and 70, leaving a medial portion 72 of strap 28 lying against, and running across, the back face, that is, mounting surface 26, of member 22. Referring again to FIG. 3, slots 64 and 66 each have a heel 74 and a toe 76, the heels being the closer ends of slots 64 and 66 to the proximal portion 42 of periphery 40. Slots 64 and 66 are both splayed outwardly relative to each other such that toes 76 are wider apart than heels 74. That is, when taken in the direction leading away from torso 'T' of the user, along bisector 'X', for example, slots 64 and 66 toe outwardly. The geometric centres of slots 64 and 66 are indicated as $C_1$ and $C_2$ respectively. A reference line drawn between geometric centres $C_1$ and $C_2$ is indicated as 'RL'. 'RL' is not perpendicular to the reference axis 'X' of the upper leg of the user. That is, a line perpendicular to 'RL' would be skewed relative to 'X'. Similarly, the perpendicular distance from geometric center $C_1$ to datum 'D' is less than the corresponding perpendicular distance $C_2$ to datum 'D'.

Referring again to FIG. 2, in which the thickness of the section has been exaggerated relative to the width, stiffening member 22 has stiffening in the nature of a main internal monolith of cardboard, indicated as 80. It is covered, on the upper, or working surface side, by a layer of vinyl 82, that can, optionally, be treated to be a wipe clean surface. That is, it can be written upon with markers or grease pencils, and subsequently wiped clean. A lower layer 84 of vinyl extends beneath monolith 80, and forms the covering of mounting surface 26. An intermediate cushioning layer 86 of a relatively softer material is sandwiched between lower layer 84 and monolith 80. Cushioning layer 86 is optional, and could underlie either layer 82 or layer 84, or both, or neither, as may be chosen. It is a relatively thin, firm layer that has some resiliency, such as some people prefer.

Referring to FIG. 3, the assembly is intended to be worn by a user on the lap, or upper thigh. Inner portion 48 lies more or less above the inside thigh of the user, and outer portion 50, lies more or less above the outer thigh. Strap 28 is cinched to a comfortable, yet firm position. Main member 22 lies relatively flat across leg 'L' so that a person using a computer can use the mouse. Main member 22 is unlikely to lie perfectly flat, or perfectly level. The tension in strap 28 will tend to cause member 22 to flex slightly on leg 'L', yielding a slightly arched working surface, rather than a perfectly flat surface. The outside of the curve of a relatively rigid surface of this nature, even when modestly arched, will present a satisfactory working surface for a mouse. A person's lap is unlikely to be either perfectly flat or perfectly level. A gravity dependent track-ball in a mouse will operate on a working surface that is not level, provided it is reasonably flat and only slightly angled. Although FIG. 3 shows assembly 20 in a position very high on leg 'L', it can also be worn lower down on the leg, for example, closer to the knee, as the user may find most comfortable depending on the seating and space available. In some instances users may prefer to wear assembly 20 about body parts other than the leg.

Figure 4:
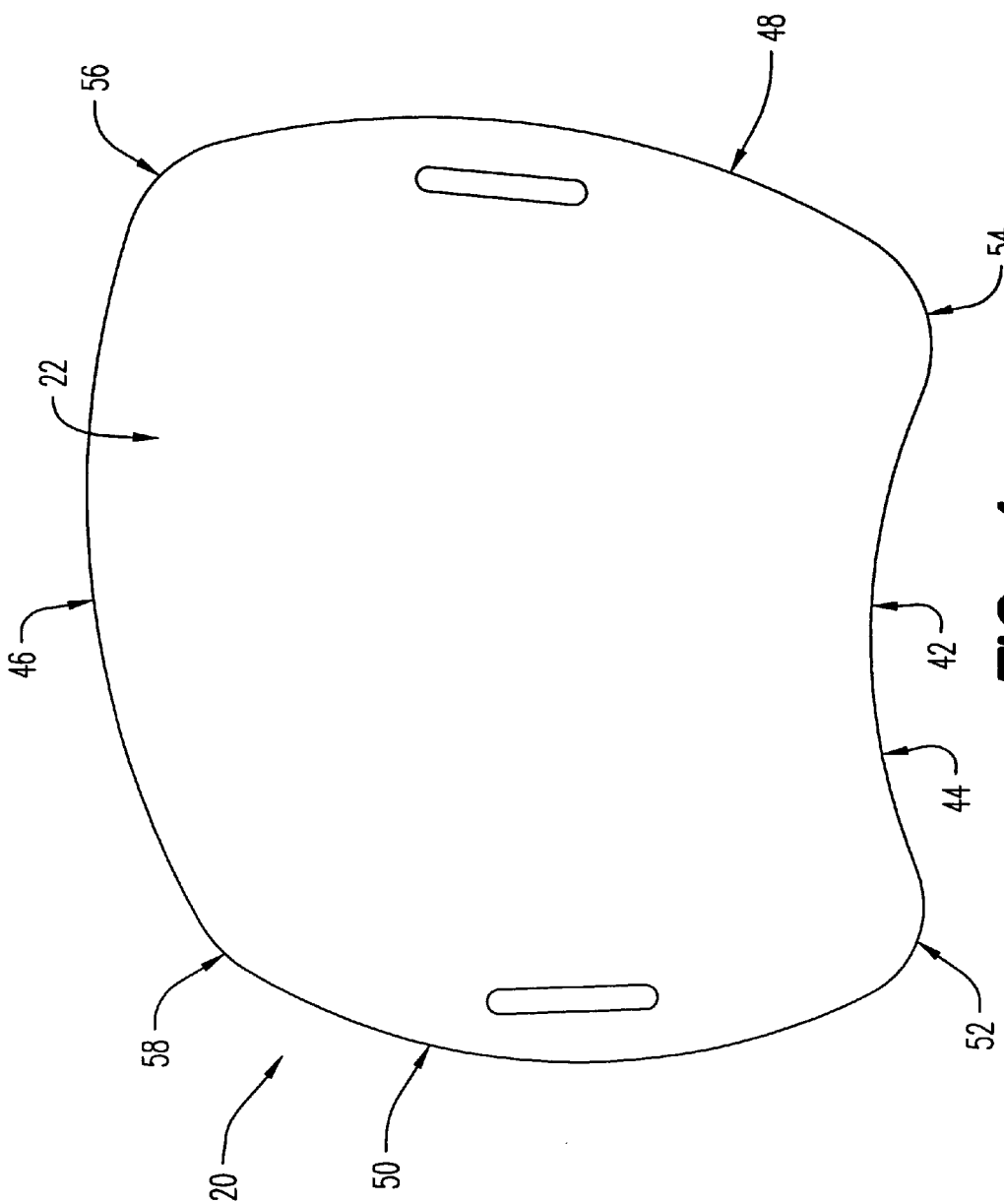
FIG. 4 is a bottom view of the mousepad of FIG. 1.

Conveniently, as shown in FIG. 4, assembly 20 can be reversed, strap 28 re-threaded, and wound about the left leg, for use by a left handed person. In either left hand or right hand configuration, strap 28 does not wrap about the leg perpendicular to reference axis 'R'. On the contrary, although assembly 20 can be moved somewhat about a user's waist to a number of different positions, it will tend to sit most comfortably, for most people, in an at least partially diagonal orientation. That is, angle beta will tend to be less than 45 degrees, preferably less than 30 degrees. In this orientation it is relatively comfortable, in the inventor's view, to rest the base of the palm of the mouse holding hand (the right hand, generally, if assembly 20 is configured as in FIG. 2), in the region between proximal portion 42 and outer portion 50, in the lobe of corner 52. The dominant lateral motion of the mouse, in use, will then be, generally, in the direction of short diagonal 62 as the user's hand pivots, or rolls, on the base of the palm. In the preferred embodiment illustrated in FIG. 3, strap 28 also does not lie perpendicular to bisector axis 'X', but is slightly angled, such that inner slot 64 lies somewhat forward of outer slot 66. That is, slot 64 lies more distant from datum 'D' than does slot 66.

When not in use, strap 28 can be wound around, or folded against member 22. As such, assembly 20 can lie easily within the standard range of attaché and brief cases (typically between 2" (5 cm) and 5" (12.5 cm) in depth). Further still, in the preferred embodiment, the thickness of member 22 is less than ¼" (6.35 mm) such that it will fit within one of the portfolio folder pouch divisions commonly found in briefcase lids, and within a file folder. A person with a modest briefcase can thus carry both the mousepad and a laptop computer together in the same case, with relative ease.

Mousepads having a pair of apertures through which to thread a strap, such as strap 28 could be manufactured with profiles other than that shown in FIG. 3. Such a mousepad could be square, rectangular, triangular, or some other polygonal shape, or a more curvaceous shape such as an oval, a circle, and ellipse, or an arbitrary shape made up of curves or curves and straight lines. These alternative cases would still avoid the clamp-like blocks or arms discussed above, and retain the thinness of the preferred embodiment.

It is not necessary that the periphery of assembly 20 be continuously rounded, although it is preferred, since it eliminates sharp corners, such as might dig into one's torso uncomfortably. Similarly, many different materials could be used to provided adequate stiffening, such as a plastic sheet. Other types of fitment could be used to attach strap 28 to mousepad member 22. For example, eyelets, or keepers could be fastened to member 22. Alternatively, strap 28 could be mounted permanently with an adhesive or could be sewn in place. Use of slots is preferred as it is relatively simple and permits the strap to be reversed for left hand use.

A preferred embodiment has been described in detail and a number of alternatives have been considered. As changes in or additions to the above described embodiments may be made without departing from the nature, spirit or scope of the invention, the invention is not to be limited by or to those details, but only by the appended claims.

I claim:

1. A computer mousepad comprising:
   a working surface upon which a computer mouse can ride;
   a portion for resting upon a support; and
   in plan view, a recess locatable against a torso of a user,
   said working surface including:
      a periphery having a proximal portion locatable adjacent to said torso, said proximal portion including said recess;
      an outboard portion locatable adjacent to an outer thigh of said user;
      a distal portion most distantly opposed to said proximal portion;
      an inboard portion locatable adjacent to an inner thigh of said user in opposition to said outboard portion;
      an inner lobe and an outer lobe defined on either side of said recess; and
      means for attaching a stay to said working surface for engagement with said user's body;
   wherein said working surface has a first diagonal that is defined by a longest straight line from (a) any first point on said outer lobe to (b) a second point on said periphery furthest from said first point, and
   a second diagonal that is defined by a longest straight line from (c) any third point on said inner lobe to (d) a fourth point on said periphery furthest from said third point, and wherein said first diagonal is longer than said second diagonal.

2. The mousepad of claim 1 wherein the working surface has a profile, in plan view, that is free of sharp corners.

3. The mousepad of claim 1, wherein said working surface is reversible to permit placement against said torso in either of (a) a left-hand configuration and (b) a right-hand configuration.

4. The mousepad of claim 1, wherein said outboard, inboard and distal portions are at least partly convexly curved.

5. The mousepad of claim 1, wherein said attaching means comprises a pair of apertures for permitting the passage of a stay in the nature of strapping to be threaded therethrough.

6. The mousepad of claim 5, wherein said pair of apertures is a pair of slots and said slots are skewed relative to each other.

7. A mousepad comprising a portion for resting upon a support, and a working surface upon which a computer mouse can ride, said working surface having defined therein a pair of apertures for permitting the passage of a stay in the nature of strapping to be threaded therethrough, wherein:

the mousepad has a periphery having a proximal portion for location proximate to a torso of a user, a distal portion for location distant from the torso, and an inner portion and an outer portion lying between, and joining, the distal and proximal portions, the inner and outer portions for placement, respectively, adjacent to an inner thigh and an outer thigh of a leg of said user;

the proximal portion has a recess for accommodating a body of said user;

the periphery includes a first lobe and a second lobe bounding the recess therebetween; and one of the apertures lies farther than the other aperture from a datum line drawn tangent to the first and second lobes.

8. The mousepad of claim 7 wherein one aperture is an inner aperture located in adjacent to the inner portion and the other aperture is located adjacent to the outer portion, and the inner aperture is farther from the datum line than the outer aperture.

9. The mousepad of claim 7 wherein the apertures are outwardly toed relative to the proximal portion.

10. A mousepad assembly comprising:

a member having a portion for resting on a support, and a working surface upon which a computer mouse can ride;

a stay in the nature of strapping for engagement with a body of a user to maintain an orientation of said working surface relative to said body; and said working surface having defined therein a pair of apertures through which said stay is threaded, wherein:

the working surface has a periphery having a proximal portion for location proximate to a torso of said user, a distal portion for location distant from the torso, and an inner portion and an outer portion lying between, and joining, the distal and proximal portions, the inner and outer portions for placement, respectively, adjacent to an inner thigh and an outer thigh of a leg of said user;

the proximal portion has a recess for accommodating a body of said user;

the periphery includes a first lobe and a second lobe bounding the recess therebetween; and one of the apertures lies farther than the other of the apertures from a datum line drawn tangent to the first and second lobes.

11. The mousepad assembly of claim 10 wherein one of the apertures is an inner aperture located adjacent to the inner portion and the other of the apertures is located adjacent to the outer portion, and the inner aperture is farther from the datum line than the outer aperture.

* * * * *